United States Patent
Merchlinsky et al.

(10) Patent No.: US 10,681,693 B2
(45) Date of Patent: Jun. 9, 2020

(54) SYSTEM AND METHOD FOR SIMULTANEOUS FDMA-TDMA CHANNEL ACCESS

(71) Applicant: Hughes Network Systems, LLC, Germantown, MD (US)

(72) Inventors: Joseph Merchlinsky, Boyds, MD (US); Peter Johns, Knoxville, MD (US); Satyajit Roy, Gaithersburg, MD (US); Yogesh Sethi, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/438,632

(22) Filed: Feb. 21, 2017

(65) Prior Publication Data
US 2018/0242313 A1 Aug. 23, 2018

(51) Int. Cl.
*H04B 7/26* (2006.01)
*H04W 72/04* (2009.01)
(Continued)

(52) U.S. Cl.
CPC .... *H04W 72/0446* (2013.01); *H04B 7/18528* (2013.01); *H04B 7/18539* (2013.01);
(Continued)

(58) Field of Classification Search
CPC .............. H04B 7/18528; H04B 7/2615; H04B 7/2045; H04B 7/2046; H04W 74/08
See application file for complete search history.

(56) References Cited

U.S. PATENT DOCUMENTS 5,790,527 A * 8/1998 Janky ................... H04B 7/2615
370/330
5,805,581 A * 9/1998 Uchida .............. H04B 7/18532
370/335
(Continued)

FOREIGN PATENT DOCUMENTS

CN 105634993 A 6/2016

OTHER PUBLICATIONS

International Search Report and Written Opinion dated Apr. 24, 2018 by the International Searching Authority (European Patent Office) in PCT Application PCT/US2018/018867.

*Primary Examiner* — Salvador E Rivas
(74) *Attorney, Agent, or Firm* — NovoTechIP International PLLC

(57) ABSTRACT

A transmitter is set to time division multiple access (TDMA) mode and allocated a first TDMA channel. In the TDMA mode, the additional TDMA channels are allocated to and deallocated from the transmitter, according a traffic demand at the transmitter, until all TDMA channels are assigned and the traffic demand reaches a threshold, whereupon the transmitter is switched to a frequency division multiple access (FDMA) mode, and assigned an FDMA channel. In response to traffic levels, the transmitter is switched to larger bandwidth FDMA channels and, optionally, to a concurrent FDMA-TDMA mode having a large bandwidth FDMA channel in addition to a number of TDMA channels. Optionally, switching the transmitter among TDMA mode, FDMA mode, and concurrent FDMA-TDMA mode is based, at least in part, on QoS, or time of day, or user statistics, or combinations thereof.

16 Claims, 7 Drawing Sheets

(51) Int. Cl.
     *H04B 7/185*      (2006.01)
     *H04B 7/204*      (2006.01)
     *H04B 7/212*      (2006.01)

(52) U.S. Cl.
     CPC ....... *H04B 7/18541* (2013.01); *H04B 7/2043* (2013.01); *H04B 7/2123* (2013.01); *H04B 7/2615* (2013.01); *H04W 72/0453* (2013.01); *H04W 72/0486* (2013.01); *H04B 7/2045* (2013.01); *H04B 7/2046* (2013.01)

(56) References Cited

U.S. PATENT DOCUMENTS

| | | | |
|---|---|---|---|
| 5,825,811 A * | 10/1998 | Souissi | H04B 1/7143 375/133 |
| 6,064,662 A | 5/2000 | Gitlin et al. | |
| 9,407,354 B2 | 8/2016 | Jackson et al. | |
| 2003/0021245 A1 | 1/2003 | Haumonte et al. | |
| 2003/0174663 A1* | 9/2003 | Dillon | H04B 7/18582 370/316 |
| 2008/0311945 A1* | 12/2008 | Balo | H04W 72/005 455/518 |
| 2011/0134866 A1* | 6/2011 | Frank | G01S 5/0252 370/329 |
| 2014/0169167 A1* | 6/2014 | Torres | H04L 41/5022 370/232 |
| 2016/0094467 A1 | 3/2016 | Hong et al. | |

* cited by examiner

SYSTEM AND METHOD FOR SIMULTANEOUS FDMA-TDMA CHANNEL ACCESS

BACKGROUND

In conventional very small aperture terminal (VSAT) satellite communication systems, the VSATs transmit uplink signals to the satellite, for retransmission over downlinks to a hub station connected, for example, to the Internet. The uplink signals carry content such as video, voice, control information, and Internet protocol communications. One known technique to prevent interference between VSAT uplink signals is time-division multiple access (TDMA), which assigns each VSAT one or more unique time slots on a shared frequency band. Another known technique to prevent interference is frequency-division multiple access (FDMA), which assigns each VSAT one or more unique frequency bands, and each band can be a continuous transmission channel.

One of the advantages of TDMA is that each VSAT has the entire shared bandwidth to itself during the time slots it is allocated. This enables the VSATs to readily transmit signals such as voice, comprising bursts of high-rate data spaced apart by low rate data intervals. An advantage of FDMA is that channels can be reserved for continuous use, thereby providing for steady rate content, e.g., streaming movies, with a sufficiently secure quality-of-service (QoS). The assigned channels, though, may lack bandwidth to carry bursts. Additional channels can be assigned, but would be idle capacity over the time interval between bursts.

Accordingly, there is a need, in VSAT and other communication networks, for systems and methods for transmitting dynamically changing types of content channels, over limited spectral resources, with adaptive content-appropriate and traffic demand appropriate selection and application of concurrent multiplexing schemes, and allocation of capacity within the selected and applied multiplexing schemes, thereby providing concurrent benefits and advantages of TDMA and FDMA, together with effective mitigation of various TDMA and FDMA shortcomings.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
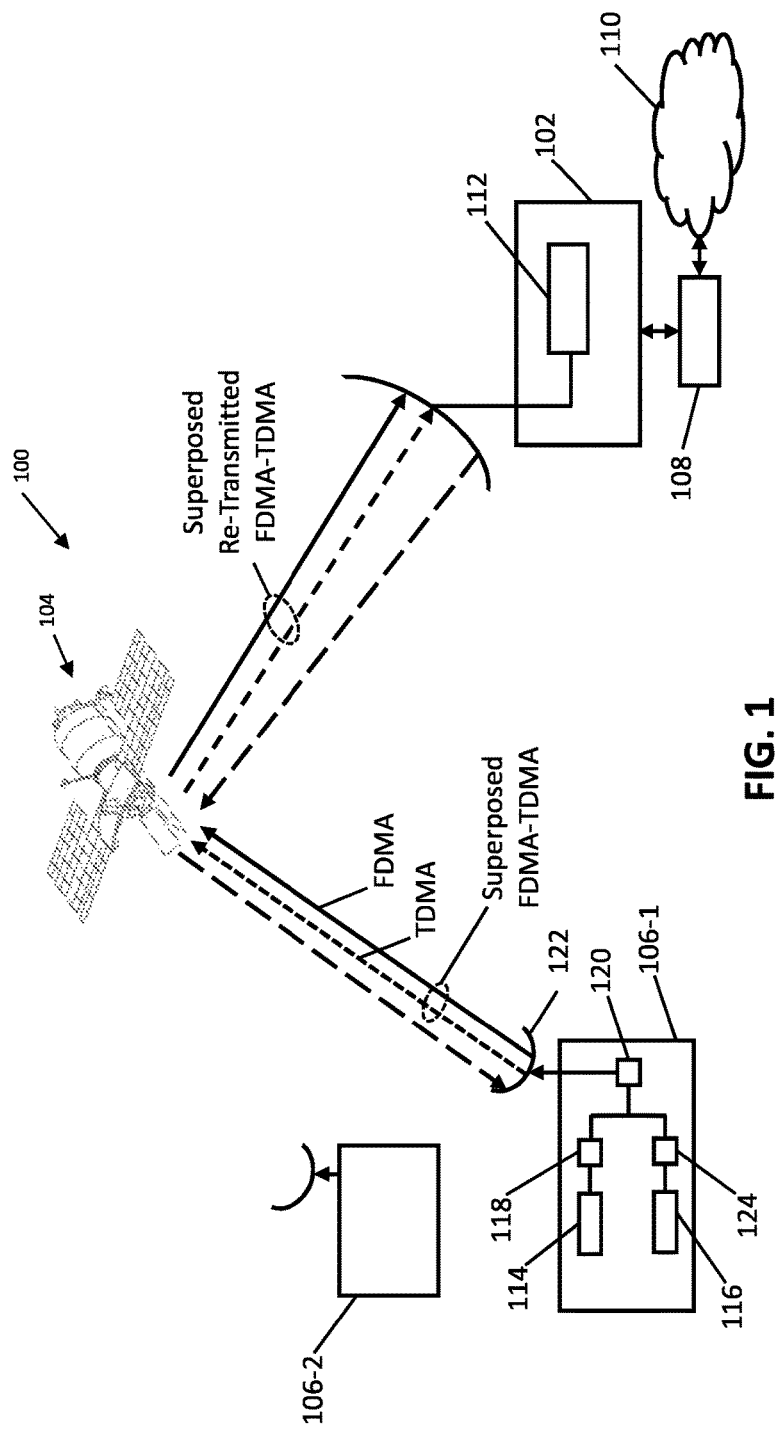
FIG. 1 illustrates a simplified diagram of one example concurrent allocation FDMA-TDMA system according to various implementations.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In an exemplary implementation according to this disclosure, one more wireless terminals can be configured with capability of wireless transmitting one or more content channels on system-allocated frequency channels within an FDMA scheme, concurrent with wireless transmitting one or more content channels on system-allocated time slots within a TDMA scheme. For purposes of description such wireless terminals can be referenced as "concurrent FDMA-TDMA terminals." However, it will be understood that "concurrent FDMA-TDMA terminals" is a coined label with no inherent meaning, and is not limitative of the scope of implementations of any disclosed method or apparatus, or any aspect thereof.

In an exemplary implementation, a controller can be configured to receive traffic demand reports, or to otherwise monitor traffic demand at one or more concurrent FDMA-TDMA terminals and, in response to the traffic demand meeting certain thresholds as described in greater detail later, to adaptively switch the concurrent FDMA-TDMA terminals among different multiplexing modes, and adaptively allocate bandwidth with the selected modes. In an aspect, the controller can be configured to adaptively switch the concurrent FDMA-TDMA terminals among, for example, a TDMA-only mode, FDMA-only mode, and a concurrent FDMA-TDMA mode, and to adaptively allocate bandwidth within the such modes.

In an implementation, the FDMA-TDMA allocation controller can be configured to store or detect a current traffic demand for each of the concurrent FDMA-TDMA terminals. The traffic demand measurement can be, for example, a scalar quantity, or can be a vector comprising multiple parameters, or can be both. For example, implementation of the current traffic demand can include information such as, for example, a content channel identifier for each content channel the terminal is requesting resources to transmit. In an aspect, associated with one or more of content channel identifiers can be a content type label, configured, for example, to characterize the content as text, voice, image, video, audio-only music, or other. In an implementation, the current traffic demand measurement can include a quality-of-service (QoS).

In an example implementation, the FDMA-TDMA allocation controller can be configured to include, in addition to the above-described traffic demand based adaptive switching of the concurrent FDMA-TDMA terminals among different multiplexing modes, and allocating bandwidth within the selected modes, detection of events or conditions that, although not directly measuring traffic demand on wireless terminals, can be statistically correlated to the traffic demand. For example, in an implementation, the FDMA-TDMA allocation controller can be configured to detect, for one or more concurrent FDMA-TDMA terminals, a correlation between one or more time periods and a corresponding traffic demand. In one illustrative operation, there can be an end user of a particular wireless terminal who uploads videos over a particular time period every day from Monday through Friday, and the FDMA-TDMA allocation controller can be configured with a training feature to detect the correlation.

FIG. 1 illustrates a high-level diagram of one concurrent FDMA-TDMA system 100 according to one exemplary implementation. The concurrent FDMA-TDMA system 100 may be configured as a bent-pipe VSAT communication system. The concurrent FDMA-TDMA system 100 can include a satellite gateway 102, a satellite 104, a first concurrent FDMA-TDMA terminal 106-1, and a second concurrent FDMA-TDMA terminal 106-2 (collectively "concurrent FDMA-TDMA terminals 106"). In an implementation, the satellite gateway 102 can be connected, for example through a network interface 108, to a wide area network (WAN) 110. The WAN 110 can be, but is not necessarily implemented by the Internet. In one implementation, satellite 104 can be, for example a geosynchronous high-capacity repeater satellite. In an example implementation, the satellite 104 can be implemented by the satellite such as illustrated in FIG. 1 of U.S. Pat. No. 9,407,354, filed Dec. 31, 2014 and issued Aug. 2, 2016, the entirety of which is hereby incorporated by reference.

Referring to FIG. 1, in an implementation, the satellite gateway 102 can be configured to include, or to be capable of accessing an FDMA-TDMA allocation controller 112. It will be understood that "FDMA-TDMA allocation controller" 112 refers to capabilities and functions, and is not necessarily a reference to any particular hardware, or to any particular location for performing such functions and operations. Example implementations of the FDMA-TDMA allocation controller 112 are described in greater detail later in this disclosure.

Figure 3:
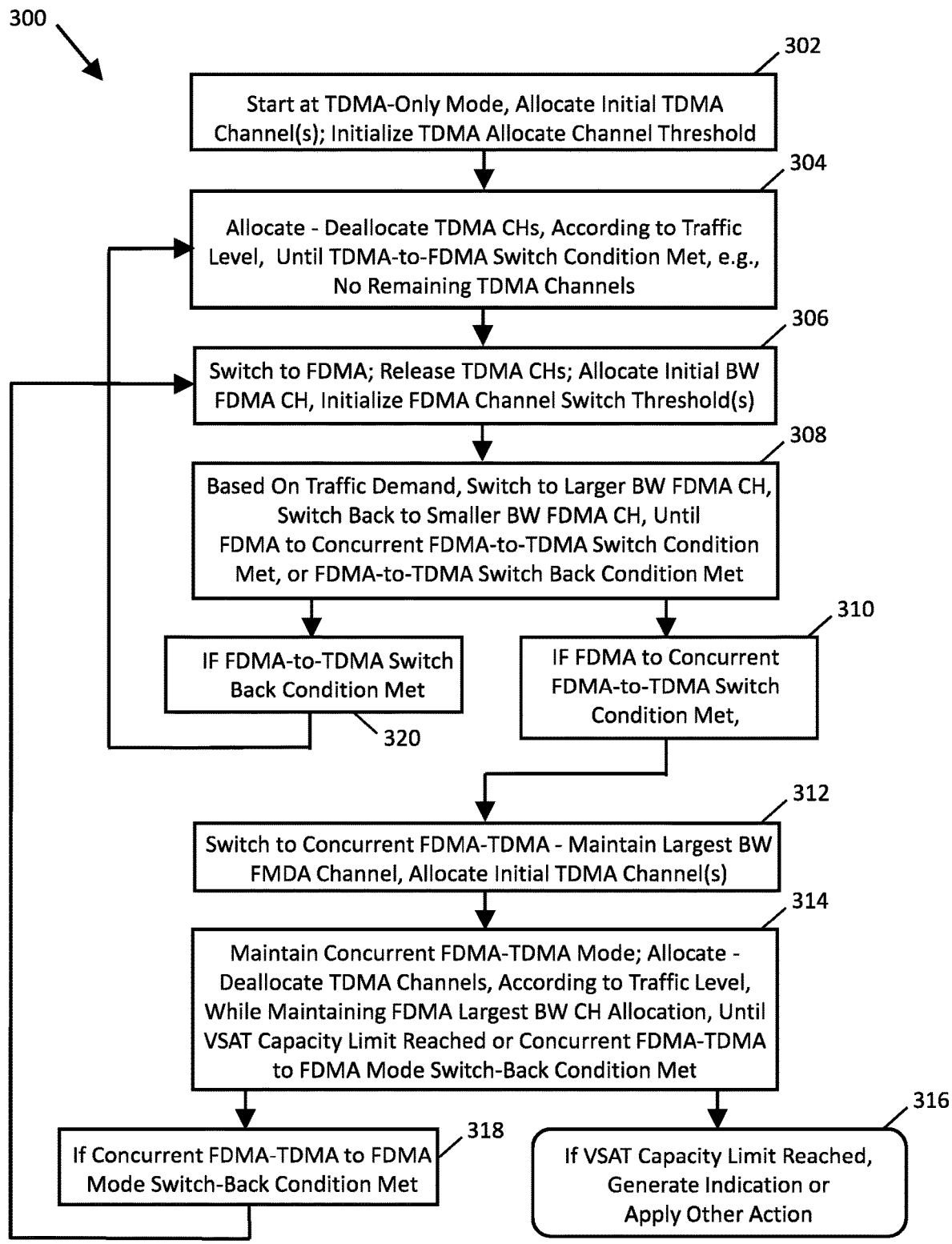
FIG. 3 shows a logical flow diagram of exemplary operations in one process of concurrent allocation FDMA-TDMA in one method according to various implementations.
Figure 4A:
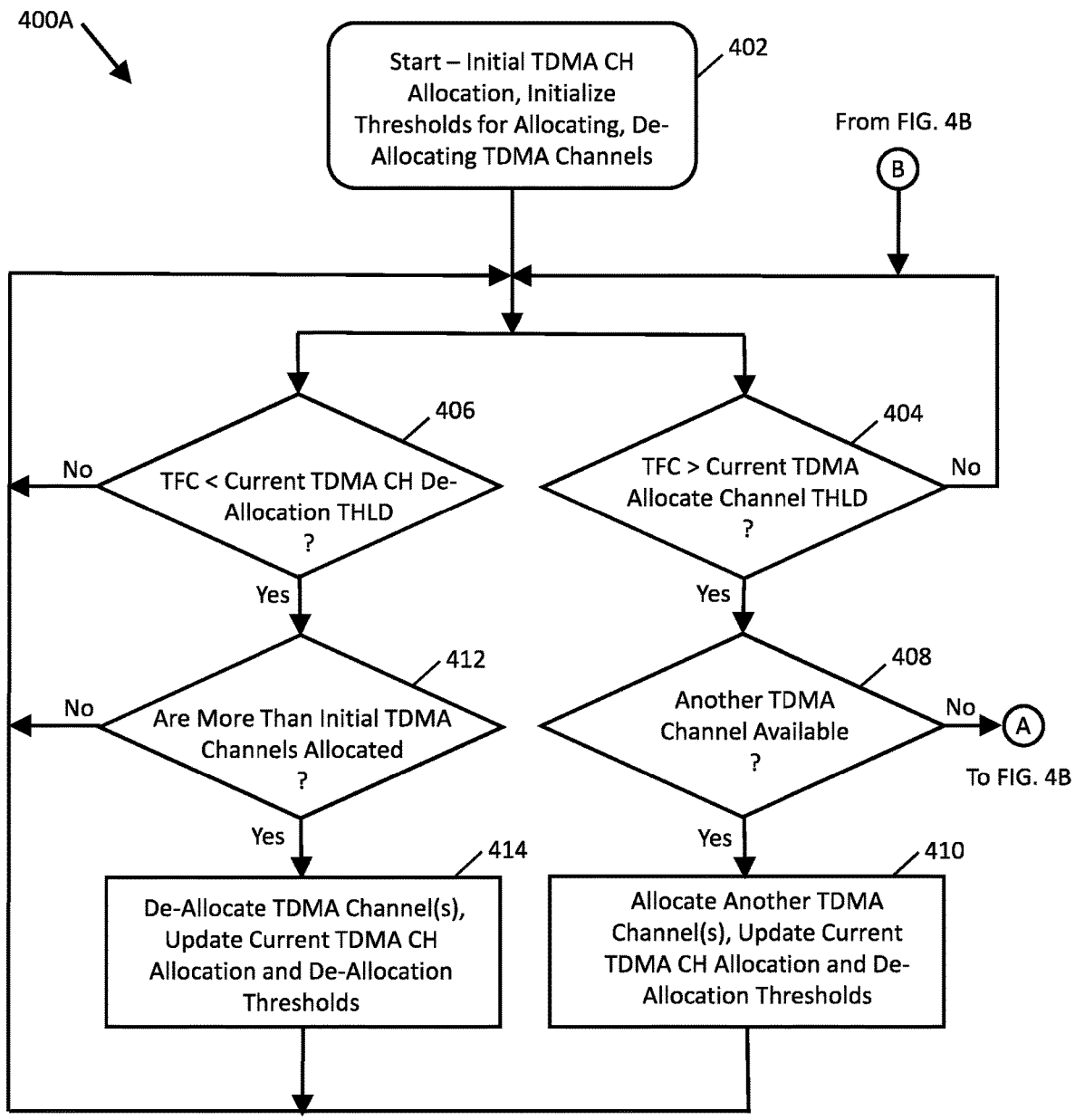
FIGS. 4A-4C represent example details in illustrative implementations of various portions of the FIG. 3 flow.
Figure 5:
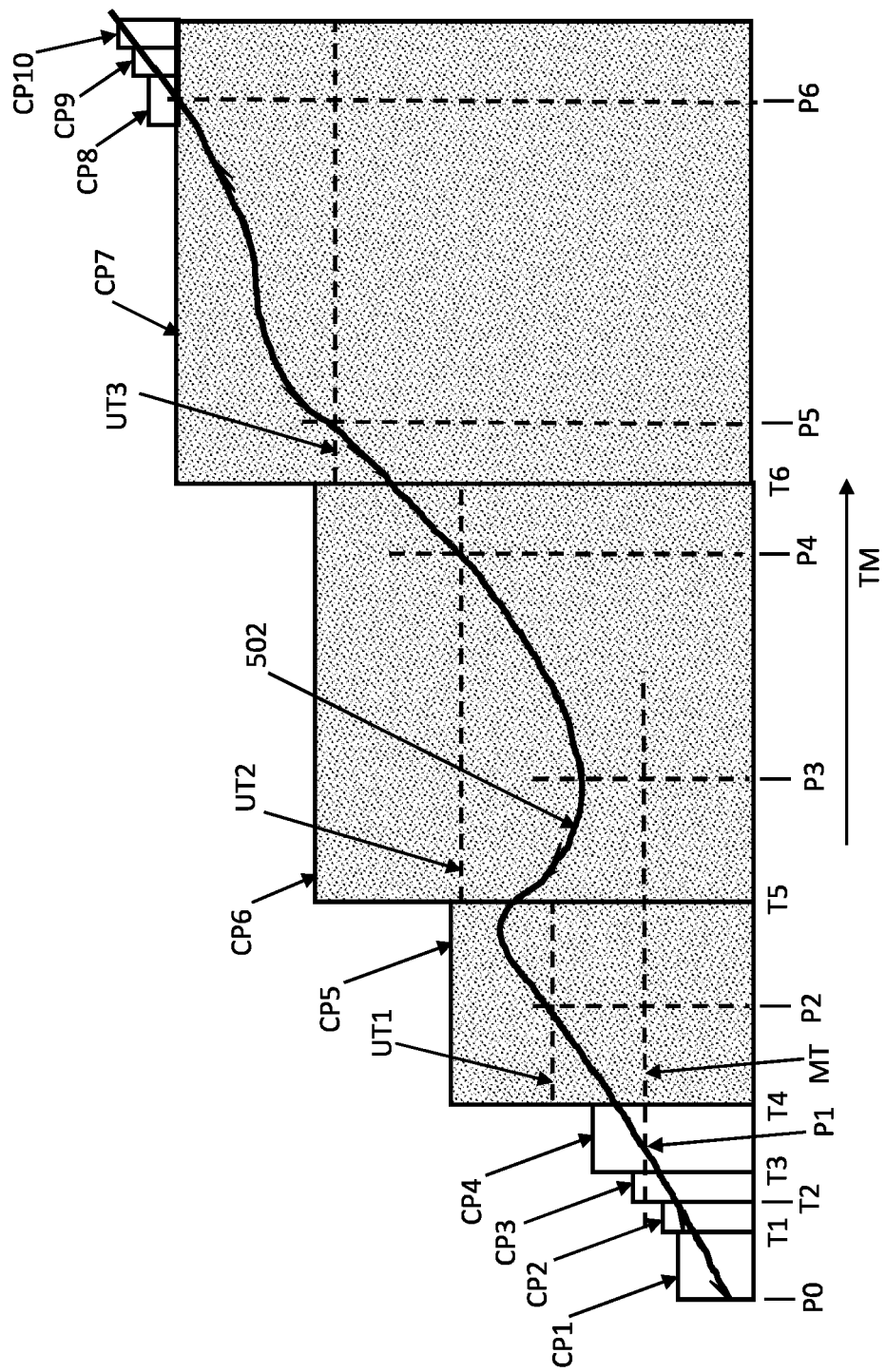
FIG. 5 illustrates examples of traffic based FDMA-TDMA mode shifting and channel allocation, in association with an example scenario of varying traffic, in a method according to one or more implementations.
Figure 6:
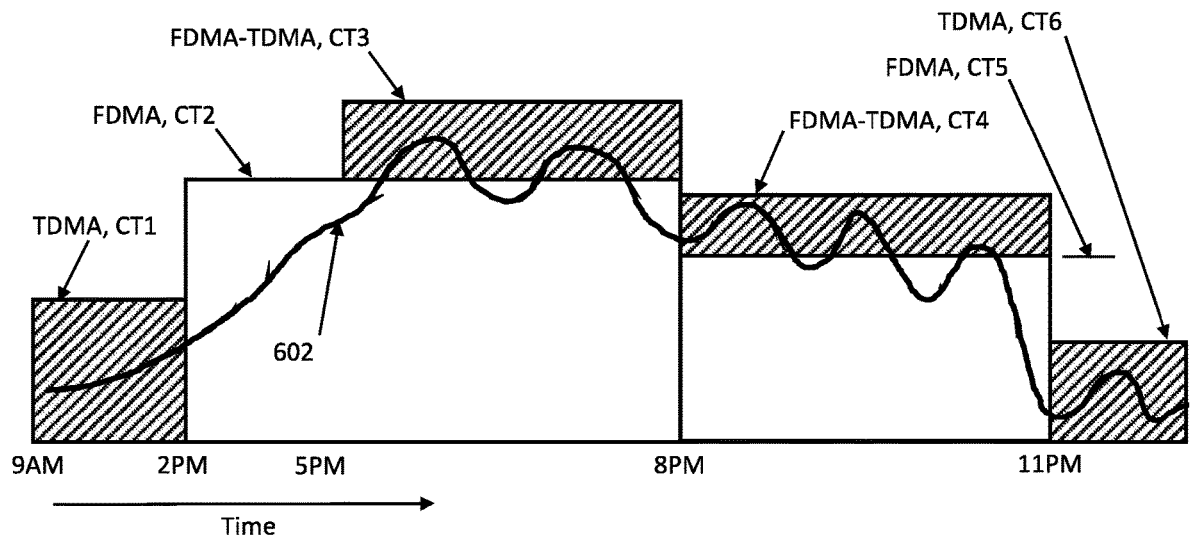
FIG. 6 illustrates examples of time-based FDMA-TDMA mode shifting and channel allocation, in accordance with various implementations.

To avoid obscuring FIG. 1 with excessive detail, only the first concurrent FDMA-TDMA terminal 106-1 is illustrated in detail and can be considered as representative of other concurrent FDMA-TDMA terminals 106 in the one concurrent FDMA-TDMA system 100, at least with respect to described functionalities. Referring to the first concurrent FDMA-TDMA terminal 106-1, the concurrent FDMA-TDMA terminals 106 can include a TDMA queue 114 and an FDMA queue 116. In one example implementation, the TDMA queue 114 and FDMA queue 116 can be implemented as respective queues or virtual queues. In one implementation, the TDMA queue 114 and FDMA queue 116 can be implemented as logical combinations or mappings of VSAT queues such as illustrated in FIGS. 4, 5, and 6 of U.S. Pat. No. 6,865,388, filed Aug. 9, 2001 and issued Mar. 8, 2005, the entirety of which is hereby incorporated by reference. In an aspect, the TDMA queue 114 can feed an encoder 118, which can be implemented, for example, as a OQPSK, 8 PSK, 16 APSK, or the like, which can feed an input to an uplink transmitter 120 that feed a terminal uplink antenna 122. The FDMA queue 116 can feed an encoder 124, which can be implemented, for example, as a OQPSK, 8 PSK, 16 APSK, or the like, which can feed the input to the uplink transmitter 120. In operation, encoder 118 and encoder 124 can operate concurrently, at respective power levels such that uplink transmitter 120 is maintained within a given liner operating region. In one implementation, the encoder 118 and encoder 124, and the uplink transmitter 120 can be implemented using OQPSK, 8 PSK, 16 APSK encoders, modulators, amplifiers and filters such as illustrated in FIGS. 3 and 4A of U.S. Pat. No. 9,407,354, filed Dec. 31, 2014 and issued Aug. 2, 2016, the entirety of which is incorporated by reference earlier in this disclosure.

In an aspect, the concurrent FDMA-TDMA terminals 106 can adapt certain features of a conventional VSAT terminal. For example, the terminal uplink antenna 122 may be a conventional VSAT terminal dish. Implementations of concurrent FDMA-TDMA system 100 can adapt certain architecture features of conventional satellite communication systems. For example, implementations can adapt a general architecture of a conventional satellite communication system having one or more hubs, a population of Very Small Aperture Terminals (VSAT), one or more satellites, and a satellite control facility. For example, implementations of concurrent FDMA-TDMA system 100 can adapt certain features of a VSAT system such as illustrated in FIG. 1B of U.S. Pat. App. Pub. No. 2016/0094467, filed Sep. 25, 2015, the entirety of which is hereby incorporated by reference. Another example can adapt certain features of a VSAT system such as illustrated in FIG. 1 of U.S. Pat. App. Pub. No. 2014/0169167, filed Feb. 21, 2014, the entirety of which is hereby incorporated by reference. It will be understood that these are only examples and are not intended to limit the scope of VSAT architectures and configurations of which features can be adapted to implement an exemplary concurrent FDMA-TDMA system 100.

It will be understood that description of implementations and aspects thereof being in reference to the FIG. 1 bent-pipe VSAT system 100, using a geostationary satellite 104 is not intended as any limitation on the scope of wireless communication systems in which aspects can be practiced. For example, instead of the geostationary satellite 104 satellite, uplink signals can be received and retransmitted by constellation of low earth orbiting (LEO) satellites. As another example, instead of the bent-pipe VSAT architecture illustrated in FIG. 1, aspects can be practiced in a point-to-point wireless system (not visible in FIG. 1).

Figure 2:
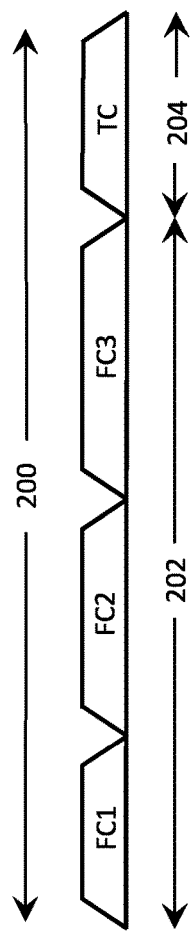
FIG. 2 illustrates one example designation of a given spectral band into an FDMA region and a TDMA region.

FIG. 2 illustrates one example allocation of a given spectral band 200 into an FDMA region 202 and a TDMA region 204. For purposes of illustration the FDMA region 202 is shown subdivided into three channels, labeled FC1, FC2, and FC3. This is not intended as a limitation on the number of FDMA channels; it is only for illustrative purposes, as implementations within the scope of this disclosure can be configured with greater than or less than three FDMA channels. The TDMA region 202 is shown as having only one TDMA shared frequency band, labeled TC. The shared frequency band TC will be referenced, for purposes of description, as "TDMA shared frequency band TC." Access to the shared frequency channel TC can be distributed as time slots. It will be understood that the example of one TDMA shared frequency bands is not intended as a limitation on the number of TDMA shared frequency bands that can be included in implementations of disclosed systems and methods. Implementations within the scope of this disclosure can be configured with, for example, two or more TDMA frequency bands.

In one or more implementations, the respective bandwidths of FDMA channels FC1, FC2, and FC3 can be configured such that one, such as the FIG. 2 example FC1, can have the smallest bandwidth, while another one—such as the FIG. 2 example FC3—can have the largest bandwidth, and one or more FDM channels with intermediate bandwidths can be provided—such as the FIG. 2 example FDMA channel FC2. In an implementation of one or more concurrent allocation FDMA-TDMA methods according to this disclosure, a given concurrent FDMA-TDMA terminal 106 can be given a default allocation, such as an integer number TST, of time slots on the TDMA frequency band TC. One example value of TST can be integer one, the given concurrent FDMA-TDMA terminal 106 can be assigned additional time slots, based for example, on traffic demand, until no additional time slots can be allocated to that terminal 106. Upon traffic demand at the terminal 106 increasing to a given FDMA-TDMA switching threshold, a controller such as the FDMA-TDMA allocation controller 112 can switch, in implementation, the concurrent FDMA-TDMA terminal 106 from TDMA to FDMA-only mode. In an implementation, a controller such as the FDMA-TDMA allocation controller 112 can apply to the concurrent FDMA-TDMA terminal 106 an initial FDMA-only assignment of a predetermined FDMA channel. In an aspect, the predetermined initial FDMA channel can be the smallest bandwidth of available FDMA channels, which in the FIG. 2 example is FC1. In an implementation, the controller (e.g., the FDMA-TDMA allocation controller 112) can be configured to detect one or more events at a given concurrent FDMA-TDMA terminal 106 while the terminal is assigned FC1, such as traffic demand meeting a given FDMA allocation increase threshold and, in response, switch that terminal 106 to the next larger bandwidth FDMA channel, such as the FIG. 2 example FC2. For purposes of description, this given FDMA allocation increase threshold can be termed a "first FDMA allocation increase threshold." In an implementation, the FDMA-TDMA allocation controller 112 or another processing resource can be configured to detect another one more events while the concurrent FDMA-TDMA terminal 106 is assigned FC1, such as traffic demand falling lower than a given de-allocation threshold, and in response can switch the terminal 106 back to TDMA-only mode. For purposes of description, this given FDMA de-allocation threshold can be termed "first FDMA de-allocation threshold."

Continuing with description of TDMA to FDMA switching aspects, in an implementation, the FDMA-TDMA allocation controller 112 or another processing resource controller can be configured to detect one more events while the concurrent FDMA-TDMA terminal 106 is assigned FC2, such as traffic demand meeting a given second FDMA allocation increase threshold, and in response switch the terminal 106 to the next larger bandwidth FDMA channel, such as the FIG. 2 example FC3. As described above regarding switching the concurrent FDMA-TDMA terminal 106 from FC1 to FC2, the FDMA-TDMA allocation controller 112 or another processing resource can be configured to release FC2 from the terminal 106 when switching it from FC2 to FC3. In an implementation, the FDMA-TDMA allocation controller 112 or another processing resource can be further configured to detect one more given events while the concurrent FDMA-TDMA terminal 106 is assigned FC2, such as traffic demand falling below a given second FDMA de-allocation threshold, and in response switch the terminal 106 back to FDMA channel FC1.

In an implementation, the FDMA-TDMA allocation controller 112 or another processing resource can be configured to detect one or more events, while the concurrent FDMA-TDMA terminal 106 is assigned the largest bandwidth FDMA channel available, which is FC3 in the FIG. 2, that indicate traffic demand has reached saturation of that FDMA channel and, in response, maintain assignment of that FDMA channel to the terminal 106, but allocate the terminal one or more TDMA channels, e.g., time slots of access to TC. As described above, these TDMA channels may have been de-allocated from the concurrent FDMA-TDMA terminal 106 when it was switched from TDMA mode to FDMA mode. The concurrent FDMA-TDMA terminal 106 can then operate in a concurrent FDMA/TDMA mode in accordance with this disclosure. In a further implementation, the FDMA-TDMA allocation controller 112 or another processing resource of the system 100 can be configured to detect certain events while the concurrent FDMA-TDMA terminal 106 is in the concurrent FDMA/TDMA mode, such as increases and decreases in traffic demand, and to respond by allocating additional TDMA channels, or de-allocating currently allocated TDMA channels until detecting a concurrent FDMA/TDMA mode exit event from among a given set of such events. In an implementation, one concurrent FDMA/TDMA mode exit event can be the FDMA-TDMA allocation controller 112 detecting, while the concurrent FDMA-TDMA terminal 106 is allocated the widest FDMA channel and a minimal TDMA channel assignment—e.g., one TDMA channel—that the terminal's traffic demand has fallen below a threshold at which the demand can be met by FDMA allocation alone, without needing TDMA channels. In an aspect, the FDMA-TDMA allocation controller 112 can be configured to respond by de-allocating that currently assigned minimal TDMA channel assignment—e.g., one TDMA channel—and switching the concurrent FDMA-TDMA terminal 106 back to an FDMA mode. In an implementation, another given concurrent FDMA/TDMA mode exit event can be the controller detecting, while the terminal 106 is allocated the largest FDMA channel and all available TDMA channels, that the terminal's traffic demand has exceeded a level that can be acceptably carried by that allocation. The FDMA-TDMA allocation controller 112 can be configured, according to various implementations, to provide various responses to such detection. One example can include notifying the concurrent FDMA-TDMA terminal 106 that its capacity has been reached.

FIG. 3 shows a logical flow diagram of exemplary operations in one flow 300 in one process of concurrent allocation FDMA-TDMA in a method according to various implementations. In describing examples in reference to FIG. 3, the term "flow 300" will be understood to mean an example process comprising operations according to the flow diagram 300. Example implementations of various operations in the flow 300 will be described in reference to an arbitrary one of the concurrent FDMA-TDMA terminals 106, and to other features illustrated in FIG. 1. The arbitrary one of the concurrent FDMA-TDMA terminals 106 will be referred to as "concurrent FDMA-TDMA terminal 106." Various of such examples will also be described in reference to the example frequency bands and channels illustrated and described in reference to FIG. 2. For example, operations in the flow 300 will be described assuming the one TDMA frequency band, TC, and the three FDMA channels, FC1, FC2, and FC3, with the bandwidth of FC3 being larger than the bandwidth of FC2 which in turn is larger than the bandwidth of FC1. Operations in the flow 300 will be described assuming, as described above, that the TDMA frequency band TC carries four TDMA channels (not separately visible in the figures). For purposes of description, it will be assumed that each of the four TDMA channels corresponds to a single time slot per frame, with each frame having a plurality of time slots. Regarding specifics of TDMA frame protocols, these can be according to one of various conventional TDMA frame protocols and neither the selection of which to employ or the configuration thereof is necessarily particular to the methods and systems of this disclosure and, therefore, further detailed description is omitted.

It will be understood that the above-described assumptions, e.g., the number of TDMA frequency bands, the number of FDMA channels, and the number of TDMA channels per TDMA band are not intended to limit or convey any preference regarding implementations of concurrent allocation FDMA-TDMA methods and systems according to this disclosure. For example, alternative implementations can provide a number of FDMA channels other than three. Regarding the number of TDMA channels per TDMS frequency band, in one alternative implementation the TDMA frequency band TC can be divided into eight or more TDMA channels (e.g., eight or more time slots) instead of four. It also will be understood that implementations are not limited to all of the TDMA channels to having the same capacity. As illustration, different TDMA channels can be provided with different capacities, i.e., different quantities of time slots. For example, one TDMA channel can correspond to a single time slot and another TDMA channel correspond to two or more time slots, and therefore two or more time the capacity.

Referring to FIG. 3, operations in one process according to the flow 300 can start at 302 where operations, for example by the FDMA-TDMA allocation controller 112, can set the concurrent FDMA-TDMA terminal 106 to a TDMA-only mode and allocate it an initial TDMA capacity of, for example, one TDMA channel (e.g., a single time slot per frame). An initialization of one TDMA channel is not a limitation. In one alternative, for example, operations at 302 can allocate the concurrent FDMA-TDMA terminal 106 more than one TDMA channel. In an implementation, the flow 300 can proceed from 302 to 304 where operations, for example by the FDMA-TDMA allocation controller 112, can allocate and de-allocate TDMA channels, based at least in part on the traffic demand level at the concurrent FDMA-TDMA terminal 106, until there are no more TDMA channels available to allocate (at least for that particular terminal 106). In an aspect, operations at 302 can include initializing at least two TDMA channel allocation—deallocation thresholds for the concurrent FDMA-TDMA terminal 106, for example, an initial allocation threshold for allocating an additional TDMA channel and an initial deallocation threshold for de-allocating a TDMA channel from the terminal 106. Assuming one TDMA channel is a minimal allocation, the initial deallocation threshold may not be applied because the one TDMA channel can remain allocated irrespective of reduction in traffic level. In an implementation, operations at 304 can include updating the TDMA channel allocation—deallocation thresholds upon each allocation of another TDMA channel and upon each de-allocation of a TDMA channel, examples of which will be described in greater detail later.

Referring to FIG. 3, upon detection at 304 (e.g., by the FDMA-TDMA allocation controller 112) of traffic demand at the concurrent FDMA-TDMA terminal 106 reaching a saturation of the TDMA capacity, with no further TDMA channels available to allocate, the flow 300 can proceed to operations at 306 and switch the terminal 106 to an FDMA mode. For purposes of description, this can be referred to as "TDMA-to-FDMA Switching Condition." In an implementation, operations at 306 can include assigning the concurrent FDMA-TDMA terminal 106 an initial FDMA channel and releasing the TDMA channels, and then proceeding to operations at 308. In an aspect, the initial FDMA channel allocated at 306 can be the smallest bandwidth of the available FDMA channels, for example, the FIG. 2 FDMA channel FC1. Operations at 306 can further include initializing FDMA channel switching threshold(s) for use in subsequent switching the terminal 106 to a larger bandwidth FDMA channel, or back to a smaller bandwidth FDMA channel, or back to the TDMA mode, as will be described in greater detail in reference to block 308.

Referring to FIG. 3, in an implementation, upon the flow proceeding from 306 to 308 the FDMA-TDMA allocation controller 112 can detect traffic demand at the concurrent FDMA-TDMA terminal 106 and, based at least in part on the traffic meeting thresholds, can switch the terminal 106 to a larger bandwidth FDMA channel, and switch the terminal back to a smaller bandwidth FDMA channel until meeting either of two exit conditions. For purposes of description, the two exit conditions from block 308 can be referred to as "FDMA Mode Exit Conditions." One of the FDMA Mode Exit Conditions can be the traffic demand at the concurrent FDMA-TDMA terminal 106 reaching a capacity limit of the currently allocated FDMA channel when no larger bandwidth FDMA channels are available. For purposes of description, this condition can be referred to as "FDMA-to-Concurrent FDMA-TDMA Switch Condition." The other of the two FDMA Mode Exit Conditions can be the traffic demand falling below a threshold at which the concurrent FDMA-TDMA terminal 106 can be switched back to TDMA mode, because the traffic does not warrant allocation of an FDMA channel. For purposes of description, this second exit condition can also be referred to as "FDMA-to-TDMA Switchback Condition."

Regarding the FDMA-to-Concurrent FDMA-TDMA Switch Condition at 308, in an implementation, upon detecting this condition the flow 300 can proceed as indicated by block 310—to apply operations that can include maintaining the concurrent FDMA-TDMA terminal 106 with its last FDMA channel, which in an aspect is the largest FDMA channel (e.g., FC3), and allocating the terminal 106 an initial one or more TDMA channels. For purposes of description, it will be assumed that the flow at 312 assigns one TDMA channel, such as one of the four TDMA channels of TDMA access to TC. This is only an example and is not intended as a limitation on initial TDMA channel assignment when switching to the concurrent FDMA-TDMA mode. As one illustration, in an aspect, operations at 312 can initially allocate two or more TDMA channels. Also, in an aspect, different terminals 106 can be given different initial numbers of TDMA channels at 312.

In an implementation, after the flow 300 proceeds to 314 operations can include detecting, for example by the FDMA-TDMA allocation controller 112, traffic demand at the concurrent FDMA-TDMA terminal 106 and, based at least in part on that traffic demand meeting thresholds, allocating additional TDMA channels, and de-allocating TDMA channels until meeting either of two exit conditions. For purposes of description, the two exit conditions from block 314 can be referred as "Concurrent FDMA-TDMA Mode Exit Conditions." In an implementation, one of the two Concurrent FDMA-TDMA Mode Exit conditions can be the traffic demand meeting a capacity limit of the combination of all available TDMA channels and the largest bandwidth FDMA channel, e.g., the FC3. For purposes of description, this exit condition can be referred to as "concurrent FDMA-TDMA Terminal Capacity Limit Reached." In an implementation, the flow 300 can respond to this exit condition by proceeding to 316 and applying, for example by the FDMA-TDMA allocation controller 112, operations of generating an indication of that concurrent FDMA-TDMA terminal 106 capacity being reached, and/or applying other operations indicative the terminal 106 reaching maximum capacity. The other of the two Concurrent FDMA-TDMA Mode Exit Conditions from block 314 can be the traffic demand at the concurrent FDMA-TDMA terminal 106 falling below a threshold at which the terminal 106 can be switched back to FDMA mode, because it does not warrant allocation of a TDMA channel in addition to the largest FDMA channel. For purposes of description, this exit condition can also be referred to as "Concurrent FDMA-TDMA Mode-to-FDMA Mode Switchback Condition." In an implementation, the flow 300 can respond by proceeding, as indicated by flow block 318, back to 306 and then to 308 where operations described above in reference to 308 can be applied.

Referring to block 314, in an implementation, the FDMA-TDMA allocation controller 112 or the concurrent FDMA-TDMA terminal 106, or both can be configured such that operation of the terminal 106 in concurrent FDMA-TDMA mode can include multiplexing data onto the TDMA channel(s) or the allocated FDMA channel based, for example, on Quality-of-Service (QoS) requirements. For example, in an implementation, latency sensitive traffic can be diverted to the concurrent FDMA-TDMA terminal 106 allocated FDMA channel, e.g., FC3, and while other terminal 106 traffic can continue to be carried on the one or more allocated TDMA channels.

Referring to block 308, as described above, the FDMA-to-TDMA Switchback Condition from block 308 can be the traffic demand falling below a threshold at which the concurrent FDMA-TDMA terminal 106 can be switched back to TDMA mode, because it does not warrant allocation of an FDMA channel. In an implementation, the flow 300 can respond to this exit condition by proceeding, as shown by flow block 320, back to 304 and applying, for example by the FDMA-TDMA allocation controller 112, operations of allocating TDMA channels to the terminal 106 and de-allocating TDMA channels from the concurrent FDMA-TDMA terminal 106, until there are no remaining TDMA channels available, and then proceeding to 306, as described above.

As will described in greater detail later in this disclosure, in an implementation, the FDMA-TDMA allocation controller 112 can be configured to set thresholds at 304 and at 314 for allocating and de-allocating TDMA channels such that thresholds for de-allocating TDMA channels are lower than corresponding thresholds for allocating TDMA channels to provide TDMA allocation hysteresis. In an aspect, the TDMA allocation hysteresis can be set sufficient to avoid, or at least reduce to an acceptable level, occurrences of oscillation between allocating and de-allocating TDMA channels. Likewise, in an implementation, the FDMA-to-TDMA Switch Back Condition thresholds applied at 308 can be set lower than the TDMA-to-FDMA Switch Condition threshold applied at 304 to provide a hysteresis sufficient to avoid, or at least reduce to an acceptable level, occurrences of the FDMA-TDMA allocation controller 112 oscillating the concurrent FDMA-TDMA terminal 106 between TDMA mode and FDMA mode. Similarly, in an implementation, the Concurrent FDMA-TDMA-to-FDMA Switch Back Condition threshold applied at 314 can be set lower than the FDMA-to-Concurrent FDMA-TDMA Switch Condition threshold applied at 308 to provide a hysteresis sufficient to avoid, or at least reduce to an acceptable level, occurrences of the FDMA-TDMA allocation controller 112 oscillating the concurrent FDMA-TDMA terminal 106 between FDMA mode and concurrent FDMA-TDMA mode. As will be understood by persons of ordinary skill upon reading this disclosure, appropriate parameters for the above-described aspects of hysteresis can be application specific. However, skilled persons guided through possession of this disclosure can determine, without undue experimentation, ranges of such hysteresis for various practices according to disclosed concepts. Further detailed description is therefore omitted.

Figure 4B:
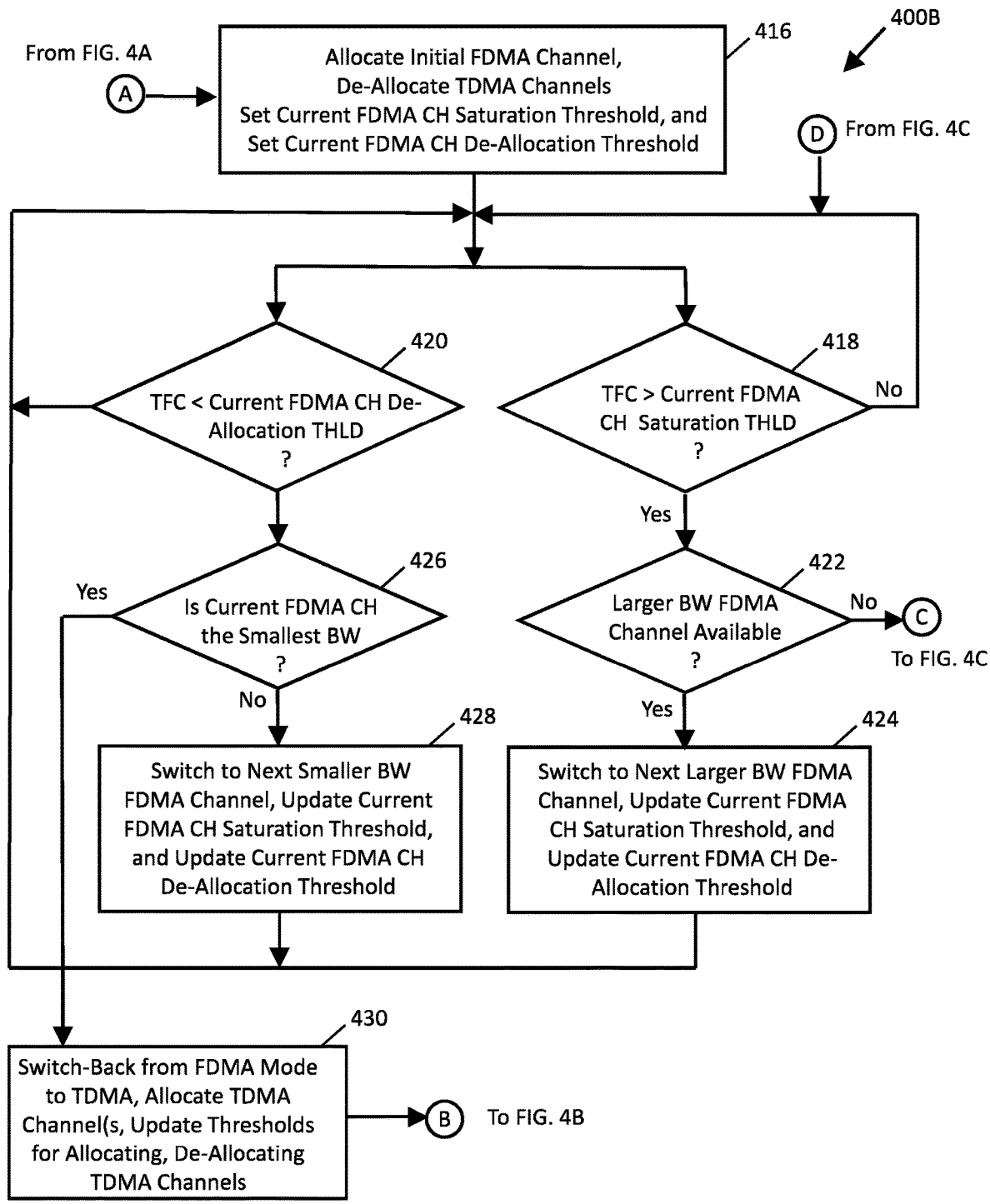
Figure 4C:
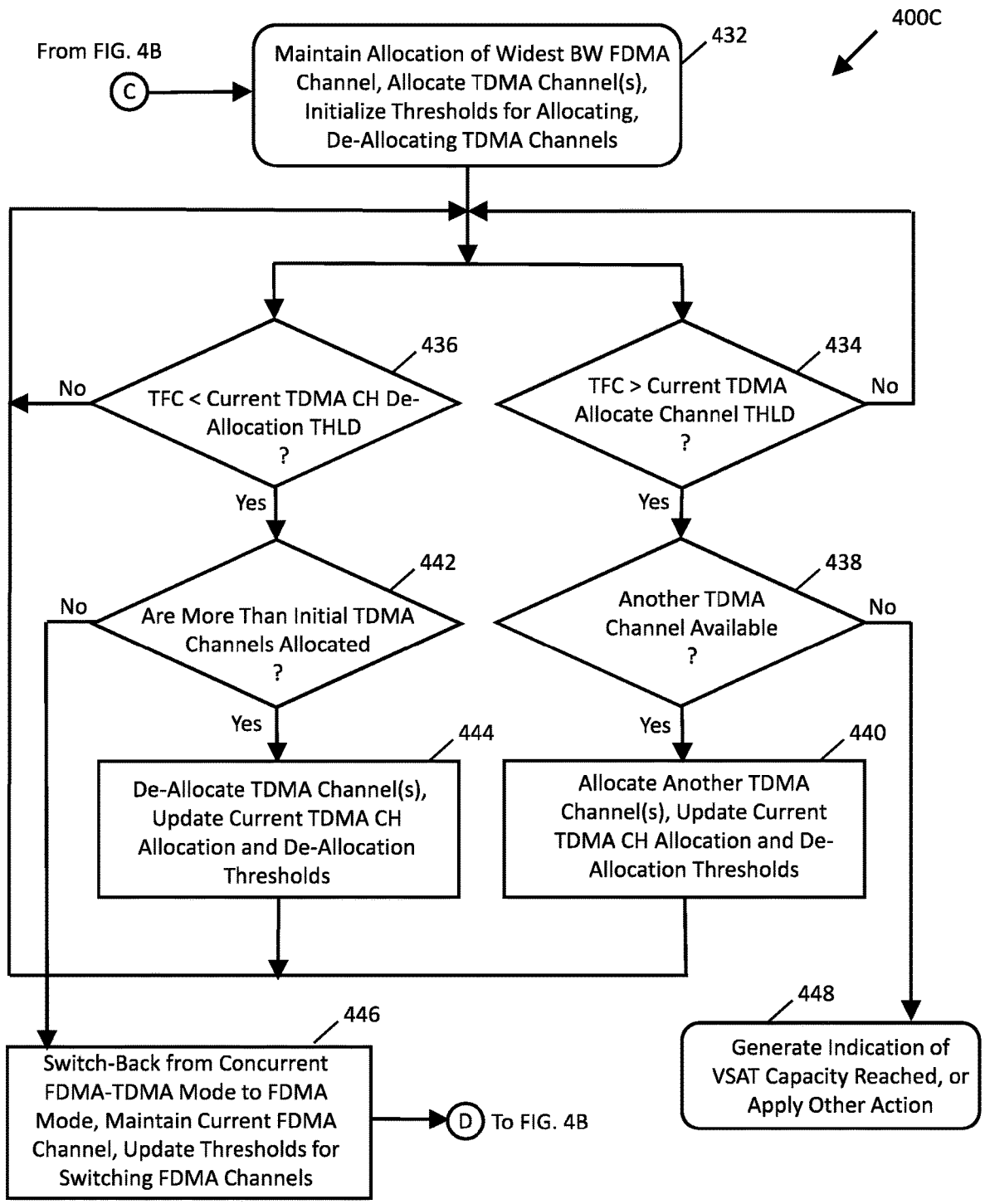

FIGS. 4A-4C illustrate respective exemplary implementations of various portions of the FIG. 3 flow 300. More particularly, FIG. 4A illustrates a flow diagram 400A of a process in one exemplary implementation of blocks or features of blocks 302 and 304 of the FIG. 3 flow 300. Operations applied at FIG. 3 blocks 302 and 304 can include, as described above, initializing a TDMA allocation to the terminal 106 and maintaining the terminal in a TDMA mode, by allocating and de-allocating TDMA channels until detecting a TDMA-to-FDMA Switch Condition and, in response, switching the terminal to an FDMA mode. Exemplary operations applied in switching the terminal 106 to the FDMA mode are described in reference to FIG. 4B. Also described in reference to FIG. 4B are operations in maintaining the terminal 106 in the FDMA mode until detecting a traffic condition warranting switching back to the TDMA mode, or warranting switching the terminal 106 to the concurrent FDMA-TDMA mode are described in reference to FIG. 4B. Operations described in reference to FIG. 4B can be one exemplary implementation of blocks or features of blocks 306, 308, 310, and 320 of the FIG. 3 flow 300. These features can include, as described above in reference to FIG. 3, initializing an FDMA channel allocation, releasing the TDMA channels, and maintaining the terminal 106 in an FDMA mode, by allocating and de-allocating FDMA channels, until detecting one of two FDMA Mode Exit Conditions, the two including the FDMA-to-Concurrent FDMA-TDMA Switch Condition and the FDMA-to-TDMA Switchback Condition. Exemplary operations applied in switching the terminal 106 to the concurrent FDMA-TDMA mode are described in reference to FIG. 4C. Also described in reference to FIG. 4C are operations in maintaining the terminal 106 in the concurrent FDMA-TDMA mode until detecting a traffic condition warranting switching back to the FDMA mode, or warranting generating an indication that the terminal 106 capacity has been reached, or another operation. Operations described in reference to FIG. 4C are one exemplary implementation of blocks or features of blocks 312, 314, 316, and 318 of the FIG. 3 flow 300. These features can include, as described above in reference to FIG. 3, initializing a TDMA channel allocation for the terminal 106, maintaining the FDMA allocation, and allocating and de-allocating TDMA channels until detecting one of two concurrent FDMA-TDMA Mode Exit Conditions. As described above in reference to FIG. 3, in an implementation, the two concurrent FDMA-TDMA Mode Exit Conditions can include the concurrent FDMA-TDMA Switch Back Condition, and the terminal 106 capacity limit condition.

Referring to FIG. 4A, in describing operations in reference to the figure the term "flow 400A" will be understood to mean an example process comprising operations according to the flow diagram 400A. Example implementations of various operations in the flow 400A will be described in reference to an arbitrary one of the concurrent FDMA-TDMA terminals 106, and with the same assumptions applied in the description above of features and operations according to the flow 300.

Operations in the flow 400A can include an arbitrary start at 402 which, in an implementation, can include the FDMA-TDMA allocation controller 112 allocating an initial TDMA channel to a given concurrent FDMA-TDMA terminal 106, and initializing thresholds for allocating and de-allocating TDMA channels to the terminal 106. The initial TDMA channel can include, for example, one of the example four TDMA channels to the TDMA band TC. The flow 400A can then proceed to 404 and 406, and apply at 404 operations to determine if the traffic demand at the terminal 106 exceeds a current TDMA allocate channel threshold, i.e., warrants allocating an additional TDMA channel (if available), and can apply at 406 operations to determine if traffic demand at the terminal 106 is less than a current TDMA channel de-allocation threshold. Stated differently, operations applied at 406 can determine if traffic at the concurrent FDMA-TDMA terminal 106 has decreased to a point warranting de-allocating one of the allocated TDMA channels—if the terminal concurrent FDMA-TDMA terminal 106 is currently allocated more than the minimum number of TDMA channels. Blocks 404 and 406 are graphically positioned in parallel, but it will be understood that their respective operations can be applied sequentially.

Referring to FIG. 4A, in an implementation, upon operations at 404 determining the traffic demand at the terminal 106 exceeds the current TDMA allocate channel threshold, i.e., warrants allocating an additional TDMA channel—if available—the flow 400A can proceed to 408 to apply operations to determine if there is another TDMA channel available. If the answer at 408 is "No" the flow 400A can jump to the labeled point "B" in FIG. 4B, and continue with operations that will be described in greater detail later. If the answer at 408 is "Yes," the flow 400A can proceed to 410 and apply operations of allocating another TDMA channel, e.g., another of the four TDMA channels for accessing the frequency band TC. In an implementation, operations at 410 can also include updating current TDMA channel allocation and de-allocation thresholds. As one specific example, assume operations at 402 are configured to allocate one TDMA channel to the concurrent FDMA-TDMA terminal 106, and afterword traffic demand at the terminal 106 increases until operations at 404 determine the traffic demand exceeds the current TDMA allocate channel threshold, i.e., warrants allocating an additional TDMA channel to the terminal. In an implementation, the FDMA-TDMA allocation controller 112 can respond by causing the flow 400A to proceed to 408 and, if operations at 408 determine another TDMA channel is available, can proceed to 410 and allocate another of the four TDMA channels to the terminal 106. The terminal 106 is now allocated two TDMA channels. Operations at 410 can also include updating current TDMA channel allocation and de-allocation thresholds to determine, respectively, when traffic demand warrants adding a third TDMA channel or has decreased to warrant de-allocating the second TDMA channel. From 410 the flow 400A can return to the above-described operations at 404 and 406.

Referring to block 406, in an implementation, upon operations determining that traffic demand at the concurrent FDMA-TDMA terminal 106 has decreased to the point warranting de-allocating one of the allocated TDMA channels the flow 400A can proceed to 412 determine if there are currently more than the minimum number of TDMA channels allocated to the terminal 106. another TDMA channel available. If the answer at 412 is "no" the flow 400A can loop back to 404 and 406. If the answer at 412 is "Yes," the flow 400A can proceed to 414 and apply operations of de-allocating one or more TDMA channels, e.g., one of the more than one TDMA channels currently allocated, update current TDMA channel allocation and de-allocation thresholds, and return to 404 and 406.

Referring to FIG. 4B, in description of example operations the term "flow 400B" will be understood to mean an example process that includes operations according to the flow diagram 400B. Example operations in the flow 400B will be described assuming an arbitrary one of the concurrent FDMA-TDMA terminals 106, and with assumptions applied in the description above of example operations according to the flow 400A.

Operations in the flow 400B can include entry at block 416, as marked by the entry point labeled "A" from operations at FIG. 4A block 408, and application at 416 of operations allocating an initial FDMA Channel, and releasing or de-allocating the TDMA channels (e.g., four TDMA channels of access to the TC band) that were allocated in the flow 400A. The initial FDMA channel allocated at 416 can include, for example, the smallest bandwidth (FC1) of the FDMA channels FC1, FC2, and FC3. Operations at 416 in the flow 400B can also include setting a current FDMA channel saturation threshold, which can be used for switching the terminal 106 to a larger bandwidth FDMA channel, and setting an initial FDMA channel de-allocation threshold, which can be used for de-allocating the currently assigned FDMA channel. In an implementation where the initial FDMA channel allocation is one FDMA channel, the initial FDMA channel de-allocation threshold can operate as FDMA-to-TDMA Switch Back threshold. The flow 400B can then proceed to 418 and 420. As described in reference to FIG. 4A blocks 404 and 406, FIG. 4B graphically positions blocks 418 and 420 in parallel, but this is not a limitation on the time ordering of their respective operations.

Referring to FIG. 4B, in an implementation, operations at 418 can be configured to determine if the traffic demand at the terminal 106 exceeds a current FDMA allocate channel threshold, i.e., if the traffic warrants switching to a larger bandwidth FDMA channel (if available). It will be understood that when the flow 400B first proceeds from 416 to 418 and 420, the current FDMA channel saturation threshold (applied at 418) can be the initial FDMA channel saturation threshold set at 416 and the current FDMA channel de-allocation threshold (applied at 420) can be the FDMA-to-TDMA Switch Back threshold.

Referring to FIG. 4B, in an implementation, upon operations at 418 determining the traffic demand at the terminal 106 exceeds the current FDMA channel saturation threshold, i.e., warrants allocating switching to a larger bandwidth FDMA channel—if available—the flow 400B can proceed to 422 to apply operations to determine if there is a larger bandwidth FDMA channel available. If the answer at 422 is "No" the flow 400B can jump to the entry point labeled "C" in FIG. 4C to switch the terminal 106 to a concurrent FDMA-TDMA mode, as will be described in greater detail later. If the answer at 422 is "Yes," the flow 400B can proceed to 424 and apply operations of switching to a larger bandwidth FDMA channel, for example, switching from FC1 to FC2, or from FC2 to FC3. In an implementation, operations at 424 can also include updating current FDMA channel switching and de-allocation thresholds. For example, assume operations at 416 are configured to allocate one FDMA channel to the concurrent FDMA-TDMA terminal 106, that FDMA channel being the FDMA channel with the smallest bandwidth (e.g., FC1), and afterword traffic demand at the terminal 106 increase until operations at 418 determine the traffic demand at the terminal 106 exceeds the current FDMA switching threshold, i.e., warrants switching from the currently assigned FDMA channel (FC1) to the next larger FDMA channel (FC2). In an implementation, the FDMA-TDMA allocation controller 112 can respond by determining at 408 that FC2 is available and can then proceed to 424 to switch the terminal to FC2, and update the FDMA channel saturation threshold and the current FDMA channel de-allocation threshold for subsequent determination at 418 and 420 of whether to maintain the terminal 106 at FC2, switch the terminal to FC3 or switch the terminal back to FC1. From 424 the flow can return to the above-described operations at 418 and 420.

Referring to block 420, in an implementation, upon operations determining that traffic demand at the concurrent FDMA-TDMA terminal 106 has decreased to the point warranting switch back to a smaller FDMA channel, or switching back to TDMA mode, the flow 400B can proceed to 426 determine if the terminal is currently at the smallest bandwidth FDMA channel. If the answer at 426 is "No," the flow 400B can proceed 428 and switch the terminal 106 back to the next smaller bandwidth FDMA channel, e.g., switch from FC3 back to FC2, or switch from FC2 back to FC1. Operations at 428 can also include updating the FDMA channel saturation threshold and the current FDMA channel de-allocation threshold for subsequent determination at 418 and 420 of whether to maintain the terminal 106 at its new, smaller bandwidth FDMA channel FC2, switch the terminal to the next larger bandwidth FDMA channel, or switch the terminal 106 back to the next smaller bandwidth FDMA channel, if available. From 428 the flow can return to the above-described operations at 418 and 420.

Referring to block 426, if the answer is "Yes," meaning the terminal 106 is currently at the smallest bandwidth FDMA channel, the flow 400B can proceed to 430 to switch the terminal 106 back from FDMA mode to TDMA mode, allocate an initial TDMA channel, update the threshold for allocating an additional TDMA channel and the threshold for de-allocating a TDMA channel, and can then jump back to the entry point labeled "B" in FIG. 4A.

Exemplary operations applied in switching the terminal 106 to the concurrent FDMA-TDMA mode, and maintaining the terminal 106 in that mode until an exit condition met are described in reference to FIG. 4C. Referring to FIG. 4C, in description of example operations the term "flow 400C" will be understood to mean an example process that includes operations according to the flow diagram 400C. Example operations in the flow 400C will be described assuming an arbitrary one of the concurrent FDMA-TDMA terminals 106, and with assumptions applied in the description above of example operations according to the flows 400A and 400B.

Referring to FIG. 4C, operations in the flow 400C can include entry at block 432, at the entry point label "C" from a "No" result of operations at FIG. 4B block 422, and application at 432 of operations allocating an initial TDMA Channel, while maintaining allocation to the terminal 106 of the largest bandwidth FDMA channel, e.g., FDMA channel FC3. Operations at 432 can also include setting a current TDMA channel saturation threshold, which can be used for allocating additional TDMA channels to the terminal 106, and setting an initial TDMA channel de-allocation threshold, which can be used for de-allocating the currently assigned TDMA channel. In an implementation where the initial TDMA channel allocation is one TDMA channel, the initial TDMA channel de-allocation threshold can operate as the concurrent FDMA-TDMA to FDMA Switchback threshold. The flow 400C can then proceed to 434 and 436. FIG. 4B graphically positions blocks 434 and 436 in parallel, but this is not a limitation on the time ordering of their respective operations.

Referring to FIG. 4C, in an implementation, operations at 434 can be configured to determine if the traffic demand at the terminal 106 exceeds a current TDMA allocate channel threshold, i.e., if the traffic warrants allocating an additional TDMA channel (if available). It will be understood that when the flow 400C first proceeds from 432 to 434 and 436, the current TDMA channel saturation threshold (applied at 434) can be the initial TDMA channel saturation threshold set at 432 and the current TDMA channel de-allocation threshold (applied at 436) can be the concurrent FDMA-TDMA-to-FDMA Switch Back threshold set at 432. In an implementation, upon operations at 434 determining the traffic demand at the terminal 106 exceeds the current TDMA channel saturation threshold, i.e., warrants allocating another TDMA channel—if available—the flow 400C can proceed to 438 to apply operations to determine if there is another TDMA channel available. If the answer at 438 is "Yes" the flow 400C can proceed to 440 and apply operations of allocating another TDMA channel, and updating current TDMA channel allocation and de-allocation thresholds, and then return to blocks 434 and 436.

Referring to block 436, in an implementation, upon operations determining that traffic demand at the concurrent FDMA-TDMA terminal 106 has decreased to the point warranting de-allocation of a TDMA channel or switching back to FDMA mode, the flow 400C can proceed to 442 determine if the terminal 106 has more than the initial number of TDMA channels. If the answer at 442 is "Yes," the flow 400C can proceed 444 and de-allocate one or more of the TDMA channels, update the TDMA channel allocation threshold and TDMA channel de-allocation threshold for subsequent determination at 434 and 436 whether to maintain the terminal 106 at its new TDMA channel allocation in the concurrent FDMA-TDMA mode, allocate another TDMA channel to the terminal 106, de-allocate another TDMA channel, or bother de-allocate a TDMA channel and switch the terminal 106 back to FDMA mode. If the answer at 442 is "No," the flow 400C can proceed 446 and switch back to the FDMA-only mode, then enter FIG. 4B flow 40B at entry point labeled "D." Operations applied at 446 can include de-allocating any allocated TDMA channels TDMA channels, updating the FDMA channel switching thresholds.

Referring to block 438, if the answer is "No," meaning the terminal 106 is currently assigned the largest bandwidth FDMA channel and all available TDMA, the flow 400C can proceed to 448 an apply, for example by the FDMA-TDMA allocation controller 112, operations of generating an indication of that concurrent FDMA-TDMA terminal 106 capacity being reached, and/or applying other operations indicative the terminal 106 reaching maximum capacity.

Referring to block FIG. 4C, in an implementation, the FDMA-TDMA allocation controller 112 or the concurrent FDMA-TDMA terminal 106, or both can be configured such that operation of the terminal 106 in concurrent FDMA-TDMA mode can include multiplexing data onto the TDMA channel(s) or the allocated FDMA channel based, for example, on QoS requirements. For example, in an implementation, latency sensitive traffic can be diverted to the concurrent FDMA-TDMA terminal 106 allocated FDMA channel, e.g., FC3, and while other terminal 106 traffic can continue to be carried on the one or more allocated TDMA channels.

FIG. 5 illustrates an example scenario of a traffic demand 502, defined according to positions on a time axis TM, for a concurrent FDMA-TDMA terminal in a concurrent FDMA-TDMA system according to one or implementations. The concurrent FDMA-TDMA terminal 106 can be, for example, an arbitrary FDMA-TDMA terminal 106 in the FIG. 1 concurrent FDMA-TDMA system 100. It will be understood that the "time axis" TM is not intended to limit the traffic demand 502 to changing over time in a manner corresponding to linear movement, left-to-right, along the axis TM. On the contrary, traffic demand 502 can progress with respect to time in a manner that may correspond to a right-to-left movement along the axis TM. In another example, traffic demand 502 can vary with respect to time in a manner that, for certain periods, may correspond to left-to-right movement along various segments of the axis TM and, for other periods, can correspond to right to left movement over the same or other segments of the axis TM.

Referring to FIG. 5, description of operations and features will assume a controller such as the FDMA-TDMA allocation controller 112 having been configured to initially allocate to the concurrent FDMA-TDMA terminal 106 one or more TDMA channels and then, in accordance with the terminal's traffic demand, allocate and de-allocate TDMA channels until, after all have been allocated, detecting a further increase in traffic that reaches a threshold and, in response, switching the terminal 106 to FDMA mode, as described for example in reference to FIG. 3 and FIG. 4A. Description will also assume the controller such as the FDMA-TDMA allocation controller 112 can be configured such that after switching the terminal to the FDMA mode, the terminal 106 can be switched, in response to increasing traffic demand, to larger and larger bandwidth FDMA channels until no further FDMA channels are available, whereupon the controller 112 can switch the terminal 106 to concurrent FDMA-TDMA mode, as described for example in reference to FIG. 3 and FIG. 4B. Further regarding FDMA mode, description will assume that the controller such as the FDMA-TDMA allocation controller 112 can be configured such that after switching the terminal to the FDMA mode, the terminal 106 can be switched, in response to decreasing traffic demand, back to smaller bandwidth FDMA channels and back to TDMA mode, as also described for example in reference to FIG. 3 and FIG. 4B. Description will also assume the controller such as the FDMA-TDMA allocation controller 112 can be configured such that after switching the terminal to the concurrent FDMA-TDMA mode, the terminal 106 can be allocated additional TDMA channels in response to increasing traffic demand, until no further TDMA channels are available, whereupon the controller 112 can indicate the t terminal 6 has reached capacity. In addition, description will assume the controller such as the FDMA-TDMA allocation controller 112 can be configured such that after switching the terminal to the concurrent FDMA-TDMA mode, TDMA channels can be deallocated from the terminal 106, and the turmoil 10 switched back to FDMA mode in response to decreasing traffic demand levels.

Referring to FIG. 5, description will assume position P0 on the time axis TM as an arbitrary starting point, and will assume the concurrent FDMA-TDMA terminal 106 is in the TDMA mode, and is assigned a single TDMA channel, e.g., a single time slot per frame of access to the band TC band. Referring to FIG. 5, the maximum transmission capacity provided by the single time slot is represented as level CP1. Continuing with the example, at a point on TM to the left of T1, the traffic demand level 502 is assumed to reach a TDMA channel addition threshold. In response, the FDMA-TDMA allocation controller 112 allocates another time TDMA channel, i.e., another slot of access to the TDMA shared frequency channel TC, for example, the second of the four time slots. FIG. 5 illustrates addition of the TDMA channel at T1, for example, due to system latencies. The FDMA-TDMA terminal 106 now has a maximum transmission capacity of CP2. Since the FDMA-TDMA allocation controller 112 has two more TDMA channels not yet assigned, the concurrent FDMA-TDMA terminal 106 is still in a TDMA-only node. The traffic demand level 502 at which the second time slot is added, and the process of allocating that time slot can be according to conventional TDMA techniques. Therefore, further detailed description is omitted. Referring to FIG. 3, the above-described addition of another TDMA channel can be according to block 308 of the flow 300, and according to blocks 404, 406, and 410 of the FIG. 4A flow 400A.

Referring to FIG. 5, and continuing with the example described above, at a point on TM to the left of T2 and to the right of T1, the traffic demand level 502 has increased to a next TDMA channel addition threshold. In response, the FDMA-TDMA allocation controller 112 can allocate to the concurrent FDMA-TDMA terminal 106 a third TDMA channel, i.e., a third time slot of access to the TDMA shared frequency channel TC. The maximum transmission capacity provided by the three time slots is CP3. After this allocation of the third TDMA channel, the FDMA-TDMA allocation controller 112 has one more TDMA channel not yet assigned, so the concurrent FDMA-TDMA terminal 106 remains in the TDMA-only node. Referring to FIG. 3, the above-described addition of another TDM channel can be according to another operation at block 308 of the flow 300, or at blocks 404, 406, and 410 of the FIG. 4A flow 400A.

Referring to FIG. 5, it can be assumed that next, at a point on TM to the left of T3 and to the right of T2, the traffic demand level 502 has further increased to another, and in this example, last TDMA channel addition threshold. In an aspect, the FDMA-TDMA allocation controller 112 can respond by allocating to the concurrent FDMA-TDMA terminal 106 the fourth and last TDMA channel, i.e., last time slot of access to the TDMA shared frequency band TC. The maximum transmission capacity provided by the four time slots is CP4. Referring to FIG. 3, the above-described addition of the fourth (and last) TDM channel can be according to yet another operation at block 308 of the flow 300, or at blocks 404, 406, and 410 of the FIG. 4A flow 400A. Referring to FIG. 5, until the traffic demand 502 reaches the FDMA-TDMA mode change level MT, the concurrent FDMA-TDMA terminal 106 remains in the TDMA-only node.

Referring to FIG. 5, it can be assumed that at point P1 the traffic demand level 502 reaches the FDMA-TDMA mode change level MT and the FDMA-TDMA allocation controller 112 responds by switching the concurrent FDMA-TDMA terminal 106 from its TDMA-only mode to its FDMA-only mode. In an aspect, operations in this switching can include releasing the four TDMA channels assigned to the concurrent FDMA-TDMA terminal 106 and allocating the terminal 106 one of the FDMA channels, for example, the smallest bandwidth FDMA channel FC1. As illustrated in FIG. 5, the FDMA-TDMA mode change level MT can be at a level lower or even substantially lower than CP4. Also, FIG. 5 shows the concurrent FDMA-TDMA terminal 106 and the FDMA-TDMA allocation controller 112 configured such that the transmission capacity CP5 of the single FDMA channel FC1 is substantially greater than the TDMA-to-FDMA mode change threshold MT. Referring to FIGS. 3, 4A and 4B, the above-described release of the four TDMA channels and allocation of a single FDMA channel can be according to an operation at block 306 of the flow 300, or a "No" result of operation at the FIG. 4A block 408 and resulting operations at block 416 of FIG. 4B.

Referring to FIG. 5, in one implementation, the FDMA-TDMA allocation controller 112 can be configured with traffic demand level "UT1" as the level that when reached by the traffic demand level 502 causes the FDMA-TDMA allocation controller 112 to switch the concurrent FDMA-TDMA terminal 106 to the next larger bandwidth FDMA channel, FC2. The maximum transmission capacity provided by the larger FDMA frequency channel is CP6. The FIG. 5 traffic demand level 502 reaches the traffic demand level UT1 at P2 on the TM axis. The time spacing between P2 and T5, which is when the second FDMA frequency channel FC2 is actually allocated to the first concurrent FDMA-TDMA terminal 106-1, can be associated with system latency. Referring to FIGS. 3 and 4B, the above-described switching of the terminal 106 to the larger FDMA channel (e.g., FC2) can be according to an operation at block 308 of the flow 300, or operations at the FIG. 4B blocks 418, 422, and 424.

Referring to FIG. 5, in one implementation, the FDMA-TDMA allocation controller 112 can be further configured with traffic demand level "UT2" as the level that when reached by the traffic demand 402 on the concurrent FDMA-TDMA terminal 105 causes the FDMA-TDMA allocation controller 112 to switch the terminal 106 to the next larger, and in this example largest last FDMA frequency channel, e.g., FC3. The maximum transmission capacity provided by the largest FDMA channel FC3 is CP7. The FIG. 5 traffic demand 502 reaches the traffic demand level UT2 at P4 on the TM axis. The time spacing between P4 and the time T6 when the terminal 106 is actually switched to the third and largest bandwidth FDMA channel FC3 can be associated with system latency. Referring to FIGS. 3 and 4B the above-described switching of the terminal 106 to the largest bandwidth FDMA channel (e.g., FC3) can be according to another operation at block 308 of the flow 300, or another operation at the FIG. 4B blocks 418, 422, and 424.

Referring to FIG. 5, in one implementation, the FDMA-TDMA allocation controller 112 can be further configured with traffic demand level "UT3" that, when reached by the traffic demand 502 on the concurrent FDMA-TDMA terminal 105, causes the FDMA-TDMA allocation controller 112 to switch the terminal 106 to the concurrent FDMA-TDMA mode, in which the terminal 106 continues with its allocated largest FDMA channel FC3, and is also allocated a TDMA channel, for example one of the four TDMA channels on the TDMA frequency band TC. The FIG. 5 example traffic demand 502 reaches the traffic demand level UT3 at P5 on the TM axis. The maximum transmission capacity provided by the largest bandwidth FDMA frequency channel FC3, combined with the one TDMA channel, is CP8. Referring to FIGS. 3, 4B and 4C, the above-described allocation of the first TDMA channel to the concurrent FDMA-TDMA terminal 106, while maintaining the terminal's allocation to the largest FDMA channels FC3, can be according to another operation at block 312 of the flow 300, or a "No" result of operations at FIG. 4B block 422, and resulting operations at FIG. 4C block 432.

Referring to FIG. 5, in one implementation, the FDMA-TDMA allocation controller 112 can be further configured with a set of traffic demand levels, not explicitly visible in FIG. 5, that can cause the FDMA-TDMA allocation controller 112 to allocate additional TDMA channels to the transmitter in accordance with the traffic demand 502 until there is, for example, only one TDMA channel available to allocate. The resulting maximum transmission capacities provided by the largest bandwidth FDMA channel FC3, combined with the two and then three TDMA channels, are CP9 and CP10. Referring to FIGS. 3 and 4C, the above-described allocation of the second and third TDMA channels to the concurrent FDMA-TDMA terminal 106, while maintaining allocation of the largest bandwidth FDMA FC3 can be according to operations at block 314 of the flow 300, or operations at FIG. 4C blocks 434, 438, and 440.

In one alternative implementation, the FDMA-TDMA allocation controller 112 can be configured with a set of traffic demand levels, not explicitly visible in FIG. 5, that can cause the FDMA-TDMA allocation controller 112 to allocate additional TDMA channels to the transmitter in accordance with the traffic demand 502, until there are no TDMA channels available to allocate. The resulting transmission capacity provided by the largest FDMA frequency channel FC3, combined with the four TDMA channels is not explicitly visible in FIG. 5, but is greater than CP10.

The scenario of traffic demand 502 illustrated by FIG. 5, and the above-described example operations do not address deallocating TDMA channels, while in the TDMA-only mode or in the concurrent FDMA-TD<A mode, in response to the traffic demand level 502 falling below TDMA deallocation thresholds. The operations also do not address switching the terminal 106 FDMA channels back to smaller bandwidth FDMA channels in response to the traffic demand level 502 falling below FDMA switch back thresholds. FIG. 5, though, illustrates one example of the above-described hysteresis that can be implemented by setting the threshold for adding an FDMA channel higher than the threshold (not visible in FIG. 5) for switching the FDMA channel. More specifically, referring to FIG. 5, the traffic demand 502 at P3 is lower than the traffic demand 502 level UT1, and this not cause release or reallocation of the second FDMA channel that was added at T5. This can be provided by setting the threshold for switching back to the smallest bandwidth FDMA channel FC1 lower than UT1. Also because of the scenario of traffic demand 502 illustrated by FIG. 5, the above-described example operations do not address switching the mode of the concurrent FDMA-TDMA terminal 106 from the FDMA-only mode it was switched to at T5 back to the TDMA-only mode.

FIG. 6 illustrates examples of time-based FDMA-TDMA shifting and channel allocation, in accordance with various implementations. Referring to FIG. 6, 602 represents a simulated traffic demand at a given concurrent FDMA-TDMA terminal, such as one of the FIG. 1 concurrent FDMA-TD<A terminals 106, over an example time span extending from 9 AM to 11 PM. In an aspect, the simulated traffic demand 602 can correspond to a simulated historical average that can be collected, for example, over a span of multiple days. In an implementation, there can be multiple traffic demands collected for a given terminal 06, for example one demand for weekdays and another demand for weekends. In the FIG. 6 example, a controller such as the FIG. 1 concurrent FDMA-TDMA allocation controller 112 can be configured to generate an FDMA-TDMA mode switching and allocation schedule, based on the correlation of traffic demand to time. In an aspect, the schedule can be generated to optimize allocation of resources, for example as a compromise between over-allocation and resulting intervals of idle resources, and under-allocation and its resulting degradation in transmission quality. In the FIG. 6 example, the FDMA-TDMA allocation controller 112 has been configured to switch, at 9 AM, the terminal 106 to a TDMA-only mode, with allocation of TDMA channels that provides a capacity labeled "CT1." In the example, the FDMA-TDMA allocation controller 112 has been further configured to switch, at 2 PM, the terminal to an FDMA mode with an assignment of an FDMA channel, e.g., FC2, that provides a capacity of "CT2." In the example, the FDMA-TDMA allocation controller 112 has been further configured to switch, at 5 PM, the terminal to concurrent FDMA-TDMA mode by maintaining allocation of the FDMA channel providing CT2, and adding a TDMA channel to increase the capacity to "CT3." The configuration can be such that CT3 provided capability to meet bursty traffic demand that, statistically, has presented at the terminal 106 over the time interval from 5 PM to 8 PM.

Referring to FIG. 6, in the illustrated example, the FDMA-TDMA allocation controller 112 has been configured to switch, at 8 PM, the FDMA channel to a smaller bandwidth FDLA channel, for example, from FC2 to FC1 or from FC3 to FC2. In an aspect, the configuration can include maintaining the same TDMA allocation as was assigned at 5 PM or, in one alternative, reducing the TDMA allocation as well. In the FIG. 6 example, the capacity resulting from the switching to a smaller bandwidth FDMA channel at 8 PM is "CT4." As illustrated in FIG. 6, the FDMA portion of the capacity CT4 is labeled "CT5" and is lower than the FDMA capacity CT2 that was provided by the FDMA-only mode over the interval from 2 PM to 5 PM. In the implementation illustrated by FIG. 6, the FDMA-TDMA allocation controller 112 has been further configured to switch the terminal 106, at 11 PM, from concurrent FDMA-TDMA mode to TDMA only mode, with TDMA channel allocation that provides capacity "CT6."

Figure 7:
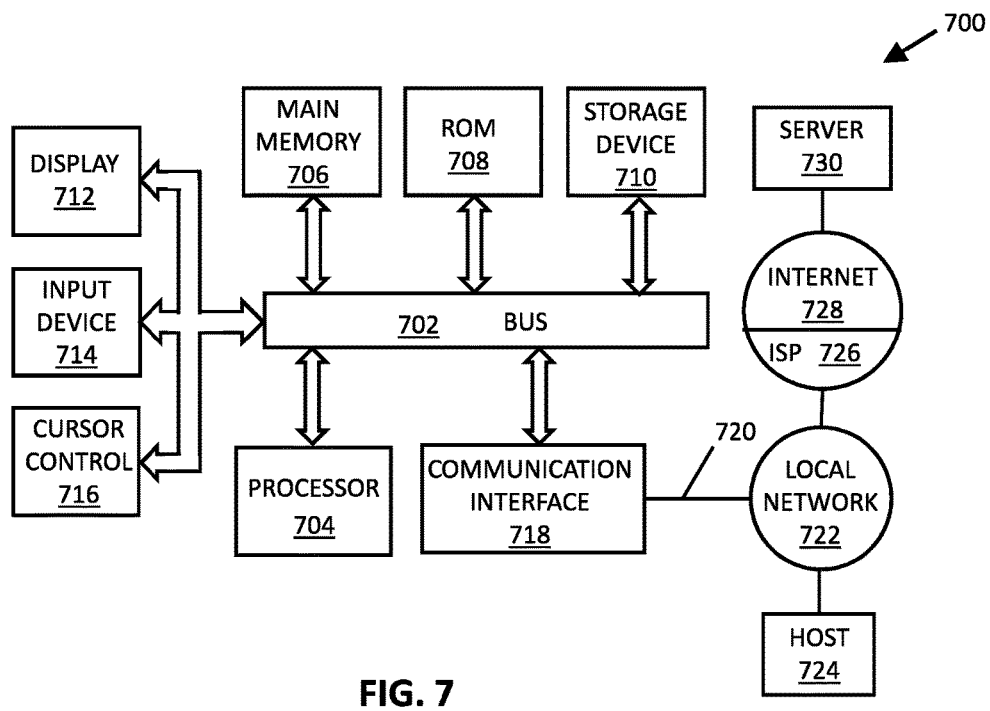
FIG. 7 is a block diagram that illustrates a computer system upon which aspects of this disclosure may be implemented.

FIG. 7 is a block diagram illustrating a computer system 700 upon which aspects of this disclosure may be implemented, such as, but not limited to the processes described at FIGS. 3, 4, and 5. Computer system 700 may include a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 may be used for storing temporary variables or other intermediate information during execution of instructions to be executed by processor 704. Computer system 700 can include a read only memory (ROM) 708 or other static storage device coupled to bus 702 for storing static information and instructions for processor 704. A storage device 710, such as a magnetic disk or optical disk, can be coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, can be coupled to bus 702 for communicating information and command selections to processor 704. A cursor control 716, such as a mouse, a trackball, or cursor direction keys can be included, for communicating direction information and command selections to processor 704 and for controlling cursor movement on display 712. The cursor control 716 can provide two degrees of freedom in two axes, a first axis (e.g., x) and a second axis (e.g., y), that allows the device to specify positions in a plane. In an aspect, a touchscreen (not separately visible in FIG. 7) can combine display 712 with hardware that registers touches upon display 712.

In an aspect, processor 704 can execute one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In some examples, hard-wired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. Forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

In some examples implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks. Volatile media includes such dynamic memory. Transmission media includes coaxial cables, copper wire and fiber optics, including the wires that comprise bus 702. Transmission media can also take the form of acoustic or light waves, such as those generated during radio wave and infrared data communications. All such media must be tangible to enable the instructions carried by the media to be detected by a physical mechanism that reads the instructions into a machine.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over, for example, a telephone line using a modem. A modem local to computer system 700 can receive the data on the telephone line and use, for example, an infrared transmitter to convert the data to an infrared signal. An infrared detector can receive the data carried in the infrared signal and appropriate circuitry can place the data on bus 702. Bus 702 can carry the data to main memory 706, from which processor 704 retrieves and executes the instructions. The instructions received by main memory 706 may optionally be stored on storage device 710 either before or after execution by processor 704.

Computer system 700 can include a communication interface 718 coupled to bus 702, to provide a two-way data communication coupling to a network link 720 that is connected to a local network 722. The communication interface 718 may be, for example, an integrated services digital network (ISDN) card or a modem to provide a data communication connection to a corresponding type of telephone line.

Network link 720 can provide data communication through one or more networks to other data devices. Network link 720 may provide a connection through local network 722 to a host computer 724 or to data equipment operated by an Internet Service Provider (ISP) 726. ISP 726 can provide data communication services through "Internet" 728. A server 730 can be connected to the Internet 728. Local network 722 and Internet 728 can use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. The received code can be executed by processor 704 as it is received, and/or stored in storage device 710, or other non-volatile storage for later execution. Computer system 700 may obtain such code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing in this disclosure is intended as, or should be interpreted to cause a dedication of any component, step, feature, object, benefit, advantage, or equivalent to the public, regardless of whether it is or is not recited in the claims.

It will be understood that terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any relationship or order between such entities or actions. The terms "comprises," "comprising," and all other variations of "comprise" are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. The word "exemplary" is used herein to mean "serving as an example, instance, or illustration." Any implementation or variation described herein as "exemplary" is not necessarily to be construed as preferred or advantageous over other implementations and variations therefore.

The Abstract of the Disclosure is provided to allow the reader to quickly identify a nature of disclosed subject matter. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method for allocating concurrent multiplex bandwidth, comprising:
   monitoring a traffic demand on a transmitter;
   while the traffic demand is less than a time division multiple access (TDMA) to frequency division multiple access (FDMA) multiplexing mode switching threshold, allocating and deallocating TDMA channels to the transmitter, based at least in part on the traffic demand; and
   upon the traffic demand meeting the TDMA-to-FDMA multiplexing mode switching threshold,
      switching the transmitter to an FDMA multiplexing mode,
      allocating a bandwidth FDMA channel to the transmitter,
      de-allocating all TDMA channels from the transmitter, and
      transmitting, in association with allocating the bandwidth FDMA channel and de-allocating all TDMA channels, a bandwidth update signal to the transmitter and to a receiver associated with the transmitter.

2. The method of claim 1, wherein the method further comprises:
   while the transmitter is in the FDMA multiplexing mode, switching the transmitter from the bandwidth FDMA channel to larger bandwidth FDMA channels and switching the transmitter back to smaller bandwidth FDMA channels, based at least in part on traffic demand at the transmitter.

3. The method of claim 2, wherein:
   switching the transmitter to larger bandwidth FDMA channels and switching the transmitter back to smaller bandwidth FDMA channels includes switching the transmitter among a plurality of different bandwidth FDMA channels and the plurality includes a smallest bandwidth FDMA channel, a larger bandwidth FDMA channel and a largest bandwidth FDMA channel, and is configured to continue switching the transmitter to larger bandwidth FDMA channels and switching the transmitter back to smaller bandwidth FDMA channels until reaching any among a plurality of FDMA-only mode exit conditions,
   the plurality of FDMA-only mode exit conditions includes an FDMA mode to concurrent FDMA-TDMA mode switch condition, and
   the FDMA mode to concurrent FDMA-TDMA mode switch condition includes detecting the traffic demand meeting a concurrent FDMA-TDMA mode switch threshold while the transmitter is allocated the largest bandwidth FDMA channel, the concurrent FDMA-TDMA mode switch threshold being higher than the TDMA-to-FDMA mode switching threshold.

4. The method of claim 3, wherein method further comprises, upon detecting the FDMA mode to concurrent FDMA-TDMA switch condition, switching the transmitter to a concurrent FDMA-TDMA mode,
wherein switching the transmitter to the concurrent FDMA-TDMA mode includes allocating one or more TDMA channels in the TDMA scheme while maintaining allocation to the transmitter of the largest bandwidth FDMA channel.

5. The method of claim 4, wherein the method further comprises, upon switching the transmitter to the concurrent FDMA-TDMA mode, allocating additional TDMA channels to the transmitter and de-allocating TDMA channels from the transmitter, based at least in part on traffic demand at the transmitter.

6. The method of claim 5, wherein allocating additional TDMA channels to the transmitter and de-allocating TDMA channels from the transmitter, based at least in part on traffic demand at the transmitter, continues until only one TDMA channel remains unallocated.

7. The method of claim 5, wherein allocating additional TDMA channels to the transmitter and de-allocating TDMA channels from the transmitter, based at least in part on traffic demand at the transmitter, continues until only no TDMA channels remain unallocated.

8. The method of claim 5, wherein:
allocating additional TDMA channels to the transmitter and de-allocating TDMA channels from the transmitter, based at least in part on traffic demand at the transmitter, continues until detecting a concurrent FDMA-TDMA mode to FDMA mode switch-back condition, and
the concurrent FDMA-TDMA mode to FDMA mode switch-back condition includes the traffic demand falling below a concurrent FDMA-TDMA mode to FDMA mode switch-back threshold while the transmitter has one TDMA channel allocated, and wherein the method further comprises:
upon detecting the concurrent FDMA-TDMA mode to FDMA mode switch-back condition, switching the transmitter back to the FDMA-only mode.

9. The method of claim 8, further comprising, while the transmitter is in the concurrent FDMA-TDMA mode, diverting some traffic to the currently assigned FDMA channel, and carrying some of the traffic on one or more allocated TDMA channels.

10. The method of claim 9, wherein at least one of the diverting and the carrying is based on at least in part on a QoS assigned to at least a portion of the diverted traffic, or at least a portion of the carried traffic, or both.

11. The method of claim 1, further comprising switching the transmitter between the TDMA multiplexing scheme and the FDMA multiplexing scheme based, at least in part, on a time schedule, wherein the time schedule corresponds to a statistical correlation between a time measurement of the time schedule and a traffic demand at the transmitter.

12. A method for allocating concurrent multiplex bandwidth, comprising:
setting a transmitter to a time division multiple access (TDMA) mode and allocating to the transmitter in the TDMA mode a first TDMA channel;
while the transmitter is in the TDMA mode, allocating additional TDMA channels to the transmitter, and deallocating TDMA channels from the transmitter, according to a traffic demand at the transmitter, until the traffic demand meets a TDMA-to-frequency division multiple access (FDMA) mode switch threshold; and
upon the traffic demand meeting the TDMA-to-FDMA mode switch threshold:
switching the transmitter to an FDMA mode, wherein said switching includes allocating a first FDMA channel to the transmitter, the first bandwidth FDMA channel having a first bandwidth, and
de-allocating the TDMA channels allocated while the transmitter was in the TDMA mode.

13. The method of claim 12, wherein the first TDMA channel has a first bandwidth, and wherein the method further comprises:
while the transmitter is in the FDMA mode, switching the transmitter to a second bandwidth FDMA channel, the second FDMA channel having a second bandwidth, the second bandwidth being larger than the first bandwidth; and
upon detecting the traffic at the transmitter meeting a switch from FDMA mode to a concurrent FDMA-TDMA mode threshold, switching the transmitter to a concurrent FDMA-TDMA mode,
wherein switching the transmitter to the concurrent FDMA-TDMA mode includes allocating to the transmitter a TDMA channel, while maintaining allocation to the transmitter of the second FDMA channel.

14. A time-division multiple access (TDMA)-frequency division multiple access (FDMA) switchable multiplexing mode communication system comprising:
a gateway;
remote from the gateway, a transmitter and a receiver, the transmitter being configured to wirelessly transmit signals, and being configured to switch multiplexing modes among a TDMA mode for transmitting according to a TDMA multiplexing scheme, and an FDMA mode for transmitting according to an FDMA multiplexing scheme;
an FDMA-TDMA allocation controller associated with the gateway, configured to detect a traffic demand level at the transmitter and, based at least in part on the detected traffic demand level, to remotely control the transmitter, the control including generating and wirelessly transmitting a bandwidth update signal over a forward wireless link from the gateway to the transmitter, to selectively switch the transmitter among the FDMA mode and the TDMA mode, wherein the control includes:
while the traffic demand level is less than a TDMA to FDMA multiplexing mode switching threshold, allocating and deallocating TDMA channels to the transmitter, based at least in part on the traffic demand level;
upon the detected traffic demand reaching an allocation threshold, switching the transmitter to the FDMA mode, allocating a bandwidth FDMA channel to the transmitter, de-allocating all TDMA channels from the transmitter, and
transmitting a bandwidth update signal to the transmitter, indicating the bandwidth, and to a receiver associated with the transmitter.

15. The TDMA-FDMA switchable multiplexing mode communication system of claim 14, wherein the FDMA-TDMA allocation controller is further configured to:
switch the transmitter, while the transmitter is in the FDMA mode, from the bandwidth FDMA channel to larger bandwidth FDMA channels and switch the transmitter back to smaller bandwidth FDMA channels, while the transmitter is in the FDMA mode, based at least in part on traffic demand at the transmitter.

16. The TDMA-FDMA switchable multiplexing mode communication system of claim 15, wherein:
- to switch the transmitter to larger bandwidth FDMA channels and switch the transmitter back to smaller bandwidth FDMA channels includes channels includes switching the transmitter among a plurality of different bandwidth FDMA channels and the plurality includes a smallest bandwidth FDMA channel, a larger bandwidth FDMA channel and a largest bandwidth FDMA channel, and to continue the switching the transmitter to larger bandwidth FDMA channels and switching the transmitter back to smaller bandwidth FDMA channels until reaching any among a plurality of FDMA-only mode exit conditions,
- the plurality of FDMA mode exit conditions includes an FDMA-only mode to concurrent FDMA-TDMA mode switch condition, and
- the FDMA mode to concurrent FDMA-TDMA mode switch condition includes detecting the traffic demand meeting a concurrent FDMA-TDMA mode switch threshold while the transmitter is allocated the largest bandwidth FDMA channel, the concurrent FDMA-TDMA mode switch threshold being higher than the TDMA-to-FDMA mode switching threshold.

* * * * *